United States Patent
Barton

(10) Patent No.: US 10,173,378 B2
(45) Date of Patent: Jan. 8, 2019

(54) LAY-UP HEAD

(71) Applicant: Composite Technology and Applications Limited, Derby (GB)

(72) Inventor: Stephen Barton, Derby (GB)

(73) Assignee: Composite Technology & Applications Limited, Derby (GB)

(*) Notice: Subject to any disclaimer, the term of this patent is extended or adjusted under 35 U.S.C. 154(b) by 92 days.

(21) Appl. No.: 15/462,290

(22) Filed: Mar. 17, 2017

(65) Prior Publication Data

US 2017/0266894 A1 Sep. 21, 2017

(30) Foreign Application Priority Data

Mar. 18, 2016 (GB) .................................. 1604603.9

(51) Int. Cl.
*B29C 70/38* (2006.01)
*B29K 105/08* (2006.01)

(52) U.S. Cl.
CPC .......... *B29C 70/384* (2013.01); *B29C 70/388* (2013.01); *B29K 2105/0872* (2013.01)

(58) Field of Classification Search
CPC ...... B39C 70/38; B39C 70/382; B39C 70/384
See application file for complete search history.

(56) References Cited

U.S. PATENT DOCUMENTS

| | | | | |
|---|---|---|---|---|
| 4,374,689 A | * | 2/1983 | Smith | B29C 53/584 156/169 |
| 4,610,402 A | * | 9/1986 | Corbett | B29C 53/8016 156/425 |
| 4,822,444 A | | 4/1989 | Weingart et al. | |
| 5,160,561 A | * | 11/1992 | Gruber | B29C 53/845 156/173 |
| 2015/0375457 A1 | | 12/2015 | Mark et al. | |

FOREIGN PATENT DOCUMENTS

| | | |
|---|---|---|
| EP | 1250991 A1 | 10/2002 |
| WO | 02070232 A1 | 9/2002 |
| WO | 2014140638 A1 | 9/2014 |

OTHER PUBLICATIONS

Aug. 23, 2016—(GB) Search Report—App. No. GB1604603.9—3 pages.

* cited by examiner

*Primary Examiner* — Jeffry H Aftergut
(74) *Attorney, Agent, or Firm* — Banner & Witcoff, Ltd.

(57) ABSTRACT

There is disclosed a lay-up head for applying elongate fiber reinforcement material to an application surface. The lay-up head comprises a guide eyelet through which elongate fiber reinforcement material is arranged to pass into the lay-up head. The guide eyelet has an eyelet rim forming a discontinuous contact surface over which elongate fiber reinforcement material is arranged to pass.

19 Claims, 4 Drawing Sheets

A—A

A–A

LAY-UP HEAD

CROSS-REFERENCE TO RELATED APPLICATIONS

The present application claims priority to GB1604603.9 filed on 18 Mar. 2016, which is hereby incorporated by reference in its entirety for any and all non-limiting purposes.

BACKGROUND

The invention relates to a composite material lay-up head for applying elongate fiber reinforcement material to an application surface. In particular, although not exclusively, the invention relates to a lay-up head having a guide eyelet through which elongate fiber reinforcement material is arranged to pass.

Fiber composite components are frequently used for applications requiring a combination of light weight and strength, for example in sports equipment and in aerospace components. Most fiber composite manufacturing processes require successive layers of fiber reinforcement material to be applied to a tool, article or a mould in a lay-up process to form a pre-form. A matrix material is typically pre-applied to the fiber reinforcement material (pre-impregnated, or "pre-preg") before lay-up of the component. Recent manufacturing developments have allowed the lay-up process to be performed automatically.

Three types of automatic composite manufacturing processes are Automatic Tape Laying (ATL), Automatic Fiber Placement (AFP) and automatic filament winding. ATL relates to the application of a tape comprising fiber reinforcement material to a tool. The tape typically comprises unidirectional fibers which are pre-impregnated with matrix material (e.g. epoxy resin). Successive tape layers are typically applied at different orientations from one another to form a ply structure.

In AFP, the fiber reinforcement material is applied to a tool in the form of a "tow", comprising a plurality of individual fibers, or multiple "tows". Alternatively, a "tow" may be a narrow width of tape slit from a wider tape. AFP is typically more suitable for complex parts having a higher degree of curvature or non-uniform curvature. The fibers are typically pre-impregnated with matrix material or drawn through a bath of matrix material. A course or series of "tows" is typically applied to the tool by an applicator roller.

Automatic filament winding differs from AFP in that the tool is typically a rotating mandrel and the lay-up equipment typically traverses the mandrel to apply a tow of fibers in tension over the mandrel surface. The angle at which the tow is laid over the mandrel can be adjusted between successive passes of the mandrel such that successive layers lie at different orientations from one another to form a ply structure and to influence the properties of the component (e.g. improved compressive or tensile strength of the manufactured component).

In all of the processes a lay-up head is typically used to dispense and apply the fiber reinforcement material to the application surface. The fiber reinforcement material is typically fed or dispensed from a dispenser, known as a creel cabinet, which retains one or more reels of fiber reinforcement material. The fiber reinforcement material is typically guided to the lay-up head using one or more guide rollers, and enters the lay-up head through a guide opening. The lay-up head may comprise a feeding mechanism for feeding the fiber reinforcement material, and a cutting mechanism for severing lengths of material.

During lay-up, the lay-up head may move and rotate relative to the creel cabinet. It is important that the lay-up equipment can permit this relative movement without the fiber reinforcement material breaking. If the fiber reinforcement material breaks during lay-up, then the lay-up process must be stopped and the equipment reset. This downtime reduces the efficiency of the lay-up process.

SUMMARY

According to an aspect there is provided a lay-up head for applying elongate fiber reinforcement material to an application surface comprising a guide eyelet through which elongate fiber reinforcement material is arranged to pass into the lay-up head, the guide eyelet having an eyelet rim forming a discontinuous contact surface over which elongate fiber reinforcement material is arranged to pass. In use, there is discontinuous contact between the contact surface and the fiber reinforcement material. This may reduce or minimise the friction between the material and the surface. The phrase "discontinuous contact surface" may mean that with elongate fiber reinforcement material passing over the contact surface, it is not in continuous contact with the said surface.

The guide eyelet may define a substantially circular opening. The eyelet rim may be substantially annular. The eyelet rim may define the edge of the opening. The eyelet rim may comprise a plurality of projections or recesses (e.g. dimples) forming the discontinuous contact surface. The eyelet rim may comprise a plurality of ridges or ribs forming the discontinuous contact surface. The eyelet rim may comprise a plurality of annular ridges forming the discontinuous contact surface. The annular ridges may be spaced apart from and substantially concentric with one another. The discontinuous contact surface may be a revolved surface. The eyelet rim may have a constant cross-section in a radial plane that includes the eyelet axis.

The eyelet rim may have a curved section. The curved section may be curved in a radial plane. The eyelet rim may thus have a curved edge formed by the curved section. The discontinuous contact surface may be formed or provided over the curved section or edge. The plurality of projections or ridges may be distributed over the curved section. The arc length of the curved section may be greater than 90° or greater than 120° or greater than 135° or greater than 175° or greater than 180°.

The lay-up head may be arranged for rotation about a first axis substantially parallel to a longitudinal axis of the lay-up head, and a second axis substantially orthogonal to the first axis. The first axis may be a twist axis and the second axis may be a tilt axis. The eyelet axis of the guide eyelet may lie in a plane parallel to the first axis.

The guide eyelet may be provided at a first (or rear) end of the lay-up head. The eyelet may be provided in a rear panel of the lay-up head. The second (or front) opposing end of the lay-up head may have a tip region.

The lay-up head may comprise a cutting mechanism for severing elongate fiber reinforcement material. The cutting mechanism may define a nip which is located towards the tip region. The lay-up head may further comprise a roller for pressing elongate fiber composite material against the application surface. The lay-up head may comprise a dispensing or feeding mechanism for drawing elongate fiber reinforcement material into the head such that it can be applied to an application surface. The lay-up head may be arranged to simultaneously apply a plurality of lengths of elongate fiber reinforcement material side-by-side.

The lay-up head may comprise a plurality of guide eyelets. The plurality of eyelets may be substantially the same as one another.

The elongate fiber reinforcement material may a tow or a tape, for example. The fiber may be dry fiber or pre-preg.

According to another aspect there is provided fiber reinforcement lay-up equipment, comprising: a dispenser (such as a creel cabinet which may be cooled) arranged to retain a reel of elongate fiber reinforcement material; and a lay-up head in accordance with any statement herein. The dispenser may retain a plurality of reels of elongate fiber reinforcement material. The axes of the or each reel may be parallel to axis 2 and/or axis 4 of a multi-axis robot. The lay-up head may be rotatable/pivotable with respect to the dispenser. The equipment may further comprise a robot comprising a robotic arm with the lay-up head attached to the end of the robotic arm. The robot may be a multiple axis robot having a fixed base and a rotatable hub coupled to the base such that it can rotate about a vertical axis. The robot may be a 2, 3, 4, 5 or 6 axis robot. The robotic arm may extend from the rotatable hub. The dispenser may be fixed to the rotatable hub. The equipment may be automatic tape laying (ATL) or automatic fiber placement (AFP) equipment.

The invention may comprise any combination of the features and/or limitations referred to herein, except combinations of such features as are mutually exclusive.

BRIEF DESCRIPTION OF THE DRAWINGS

Embodiments of the invention will now be described, by way of example, with reference to the accompanying drawings, in which.

DETAILED DESCRIPTION

Figure 1:
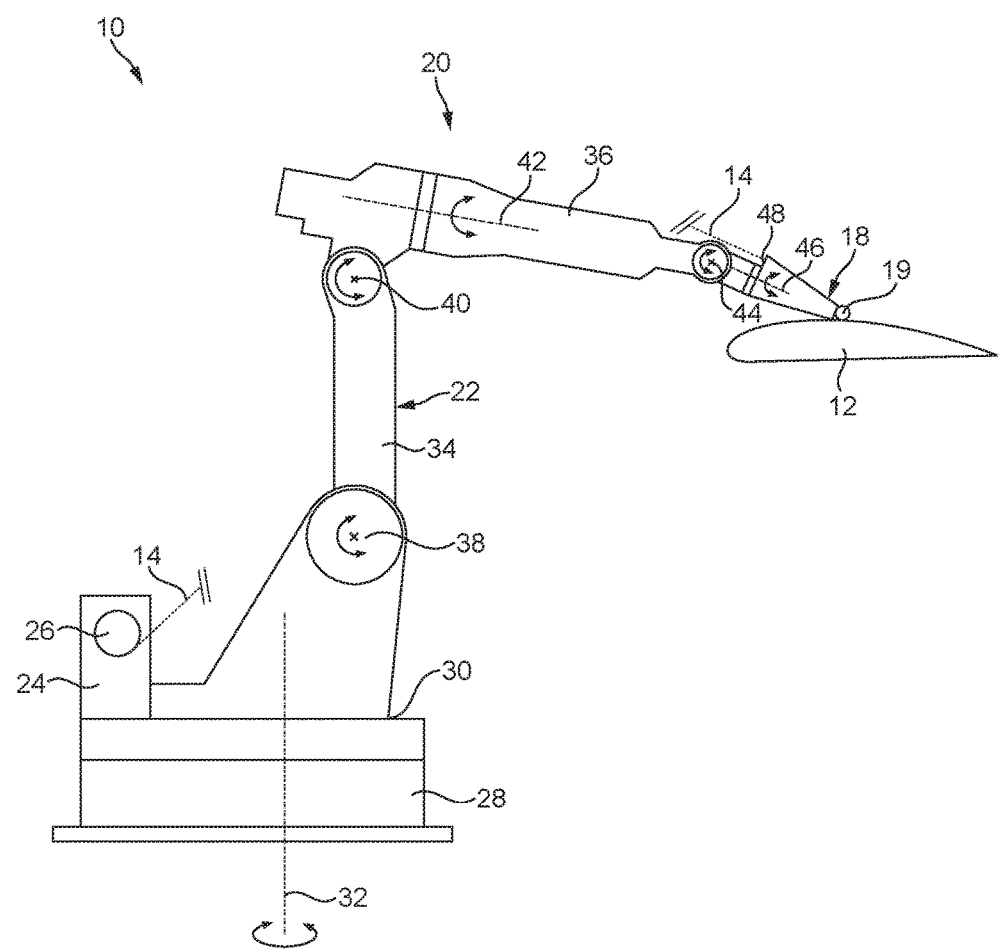
FIG. 1 schematically shows composite material lay-up equipment applying lengths of elongate fiber reinforcement material to an article.

FIG. 1 shows composite material lay-up equipment 10 and a tool 12 to which fiber composite material is applied to form a pre-form for a composite material component, for example an aerospace component such as a fan blade. The equipment 10 performs a lay-up process in which a plurality of fiber composite tows 14 are applied to the tool surface 12 side-by-side. In this embodiment, the equipment 10 comprises a 6-axis robot 20 having a composite material lay-up head 18 attached to the end of the robotic arm 22 (i.e. the lay-up head is the end effector).

The lay-up head 18 comprises a support head which carries a dispensing or feeding mechanism for dispensing elongate fiber composite material (i.e. tows of composite material) 14, a cutting mechanism for cutting lengths of fiber composite material, and a roller 19 (which may be referred to as a fiber placement roller or an applicator roller) located at the tip region for pressing the fiber composite material 14 against the tool application surface. In use, the dispensing mechanism dispenses fiber composite material in a generally longitudinally extending dispensing direction that is parallel to the longitudinal axis (i.e. front to rear axis) of the lay-up head.

The six-axis robot 20 comprises a fixed base 28 and a hub 30 that is rotatably mounted to the base 28 such that the hub 30 can rotate about a vertical axis 32. This vertical axis 32 is commonly referred to as axis 1. The robotic arm 22 of the robot 20 has a lower arm 34 and an upper arm 36. The lower arm 34 is attached to the hub 30 such that it can pivot about a horizontal axis 38 which is commonly referred to as axis 2. The upper arm 36 is attached to the end of the lower arm 34 such that it can pivot about a horizontal axis 40 which is commonly referred to as axis 3. Axes 2 and 3 are parallel to one another. The upper arm 36 is rotatable about an axis 42 that is parallel to the longitudinal axis of the upper arm 36, and this axis is commonly referred to as axis 4. The end effector of the robot 20, which in this case is the lay-up head 18, is provided at the end of the robotic arm 22 and can pivot/rotate about two orthogonal axes 44, 46 which are commonly referred to as axes 5 and 6. Axis 6, indicated as 46, is parallel to a longitudinal axis of the lay-up head 18, and axis 5, indicated as 44, is perpendicular to axis 5.

The equipment 10 also comprises a dispenser 24 (sometimes referred to as a creel cabinet) which retains a plurality of reels 26 of tows. The dispenser 24 is fixed (or mounted) to the hub 30 of the robot 20 such that it rotates about the vertical axis 32 with the hub 30 and robotic arm 22.

In use, the equipment 10 feeds or dispenses a plurality of tows 14 from the dispenser 24 and, by using a robotic controller (not shown), the robot 20 is operated to move the lay-up head 18 relative to the surface of the tool 12 to apply the tows 14 to the application surface. In this embodiment the tows 14 are pre-impregnated with matrix material such as epoxy resin, but in other embodiments each tow may comprise fiber reinforcement material only (often referred to as "dry fiber") and matrix material may be added subsequently. The tows 14 pass between the tool 12 and the roller 19 which presses them against the tool 12. At the end of an appropriate stage of the lay-up process, the tows 14 are cut by the cutting mechanism.

Figure 2:
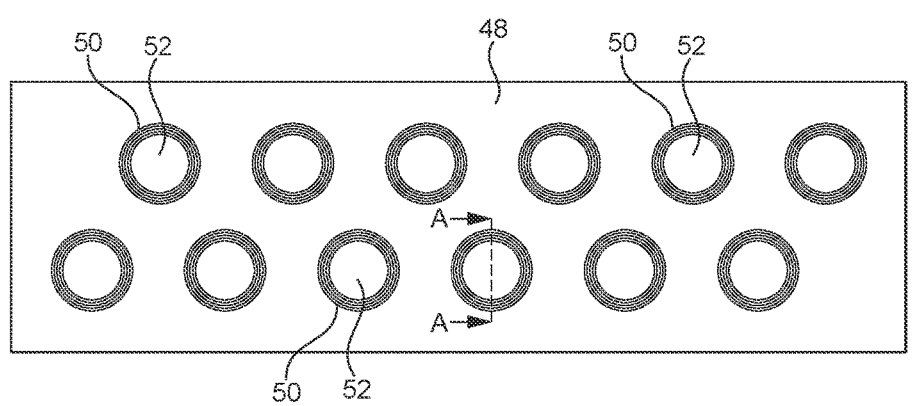
FIGS. 2 and 3 schematically shows the rear of the lay-up head of FIG. 1.
Figure 3:
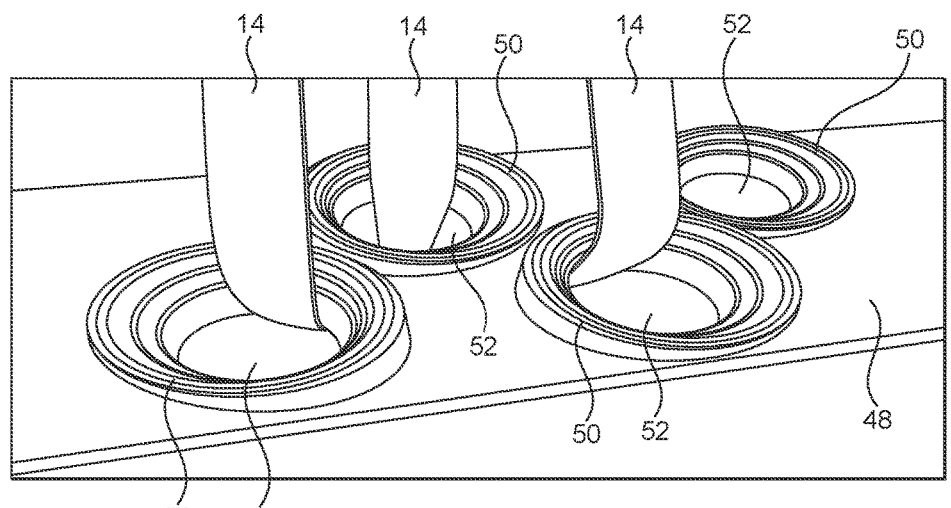

As indicated in FIG. 1, the tows 14 fed from the dispenser 24 pass into the lay-up head 18 from the rear of the lay-up head 18 so that they can be applied to the application surface from a tip region of the lay-up head 18. Referring now to FIGS. 2 and 3, a rear panel 48 of the lay-up head 18 comprises a series of substantially identical guide eyelets 50, and, in use, an individual tow 14 passes through a circular opening 52 defined by each eyelet 50. Each eyelet 50 has an eyelet axis, and the eyelet axes are all parallel to one another. Further, each eyelet axis lies in a plane that is parallel to the longitudinal axis of the lay-up head. In the embodiment shown in FIG. 2, there are 12 guide eyelets 50, but it should be appreciated that there could be any suitable number of eyelets 50, depending on the number of lengths of fiber reinforcement material being applied. The guide eyelets 50 are arranged to accommodate rotational/pivotal movement of the lay-up head 18 relative to the dispenser 24. Specifically, the eyelets 50 allow the lay-up head 18 to tilt up and down about the axis 44 (axis 5) and allow the lay-up head 18 to twist about the axis 46 (axis 6), without the tows 14 breaking.

Figure 4:
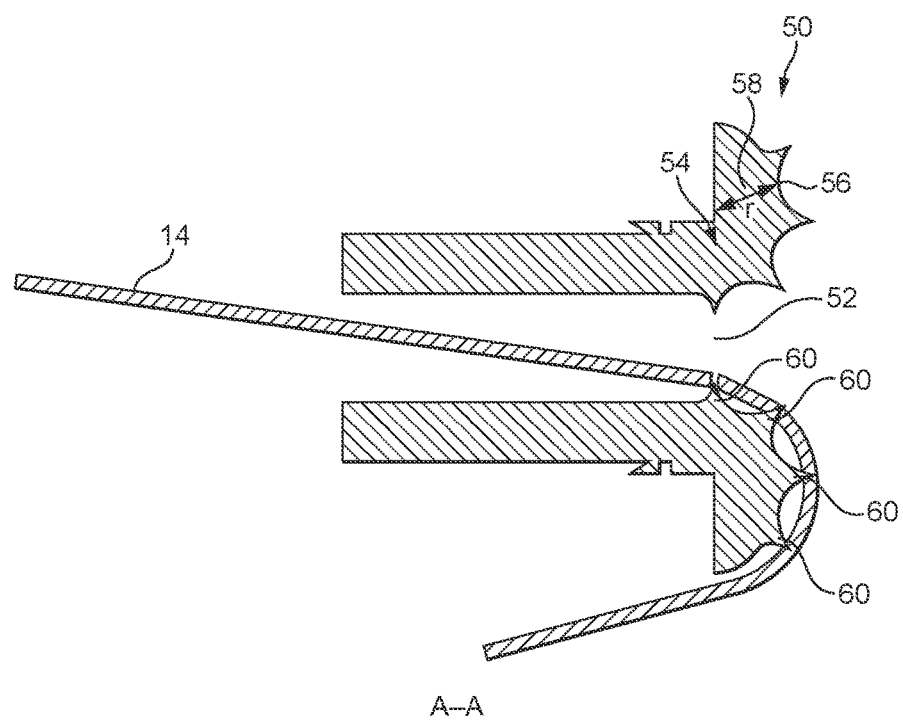
FIG. 4 schematically shows the cross-section A-A through a guide eyelet of FIG. 2.

Referring to FIG. 4, each guide eyelet 50 defines a substantially circular opening 52 through which a tow 14 can pass into the lay-up head 18. The guide eyelet 50 comprises an eyelet rim 54 which is substantially annular and defines the edge of the opening 52. The eyelet rim 54 forms a contact surface 56 which in this embodiment is a discontinuous contact surface 56. As shown in FIG. 4, in use, a tow 14 passes through the opening 52 of the guide eyelet 50 and passes over the contact surface 56. The contact surface 56 is referred to as being "discontinuous" because with the tow 14 passing over the surface 56, it is not in continuous contact with the surface 56. This reduces the friction between the two 14 and the contact surface 56.

The eyelet rim 54 has a generally curved edge section 58 in a radial plane including the eyelet axis. In this embodiment the arc length of the curved section is approximately 180°, but it should be appreciated that the curved section 58 could have any suitable arc length. The curved section 58 thus provides a generally rounded edge to the eyelet 50 over which the tow 14 can pass. In this embodiment, the radius of curvature r of the curved section 58 is approximately 10 mm-15 mm. However, it should be appreciated that any suitable radius of curvature could be used. The discontinuous contact surface 56 is a revolved surface (i.e. it has a constant cross-section), which in this arrangement is formed by a plurality of ridges or ribs 60 that are distributed over the curved section 58. The discontinuous contact surface 56 is formed by four annual ridges 60 that are concentric with one another and the eyelet axis, and which are evenly spaced from one another and distributed over the curved section 58. As can be seen from FIG. 4, the ridges 60 result in the eyelet rim 54 having a profiled surface, in particular, a wavy or corrugated profile. This means that when a tow 14 passes over the discontinuous contact surface 56, it is only in contact with the peaks of the ridges 60, and not with the troughs formed between the ridges 60. This minimises the contact area between the tow 14 and the eyelet rim 54. Although it has been described that the discontinuous surface 56 is formed by a plurality of ridges, it should be appreciated that it could be formed by any suitable arrangement. For example, it could be formed by a plurality of projections, or by slots formed in an outer surface. In another arrangement, it could be formed by a "dimpled" surface.

In use, the eyelets 50 accommodate the tilting movement (about axis 5) and the twisting movement (about axis 6) of the lay-up head 18, preventing the tows 14 from being snapped or broken. Specifically, the annular eyelet rim 54 allows the lay-up head 18 to twist about axis 6 as the tow 14 can circumferentially slide around the edge 54 of the eyelet 50. The curved section 58 of the eyelet rim 54 allows the lay-up head 18 to tilt about axis 5, as the tow 14 can follow the radius of curvature r of the curved section 58. Importantly, since the contact area between the tow 14 and the contact surface 56 is discontinuous, the friction is reduced, which reduces the likelihood of the tow 14 snapping or otherwise breaking. This reduces the amount of machine "downtime" and improves the production quality.

Although it has been described that the lay-up equipment 10 comprises a 6-axis robot, it should be appreciated that any multi-axis robot or other apparatus capable of manipulating a lay-up head 18 could be used.

I claim:

1. A lay-up head for applying elongate fiber reinforcement material to an application surface, the lay-up head comprising:
   a guide eyelet configured to receive elongate fiber reinforcement material and further pass through the elongate fiber reinforcement material into the lay-up head, the guide eyelet comprising:
   an eyelet rim forming a discontinuous contact surface over which the elongate fiber reinforcement material is arranged to pass.

2. The lay-up head according to claim 1, wherein the guide eyelet defines a substantially circular opening.

3. The lay-up head according to claim 1, wherein the eyelet rim comprises a plurality of projections, each having a terminal end, wherein the terminal ends comprise the discontinuous contact surface.

4. The lay-up head according to claim 1, wherein the eyelet rim comprises a plurality of ridges, each having a terminal end, wherein the terminal ends comprise the discontinuous contact surface.

5. The lay-up head according to claim 1, wherein the eyelet rim comprises a plurality of annular ridges, each having a terminal end, wherein the terminal ends comprise the discontinuous contact surface.

6. The lay-up head according to claim 5, wherein the annular ridges are spaced apart from and substantially concentric with one another.

7. The lay-up head according to claim 1, wherein the eyelet rim has a curved section.

8. The lay-up head according to claim 7, wherein the discontinuous contact surface is formed over the curved section.

9. The lay-up head according to claim 8, wherein a plurality of projections or ridges are distributed over the curved section.

10. The lay-up head according to claim 7, wherein an arc length of the curved section is greater than 90° or greater than 135°.

11. The lay-up head according to claim 1, wherein the lay-up head is arranged for rotation about a first axis substantially parallel to a longitudinal axis of the lay-up head, and a second axis substantially orthogonal to the first axis.

12. The lay-up head according to claim 11, wherein an eyelet axis of the guide eyelet lies in a plane parallel to the first axis.

13. The lay-up head according to claim 1, wherein the guide eyelet is provided at a first end of the lay-up head, and wherein a second opposing end of the lay-up head has a tip region.

14. The lay-up head according to claim 1, wherein the lay-up head comprises a cutting mechanism for severing the elongate fiber reinforcement material.

15. The lay-up head according to claim 1, wherein the lay-up head further comprises a roller configured to press elongate fiber composite material against the application surface.

16. The lay-up head according to claim 1, wherein the lay-up head comprises a plurality of guide eyelets.

17. A fiber reinforcement lay-up apparatus, comprising:
   a dispenser configured to retain a reel of elongate fiber reinforcement material; and
   a lay-up head rotatable with respect to the dispenser, the lay-up head comprising:
   a guide eyelet configured to receive elongate fiber reinforcement material and further pass through the elongate fiber reinforcement material into the lay-up head, the guide eyelet comprising:
   an eyelet rim forming a discontinuous contact surface over which the elongate fiber reinforcement material is arranged to pass.

18. The fiber apparatus lay-up apparatus according to claim 17, further comprising a robot comprising a robotic arm with the lay-up head configured to be attached to an end of the robotic arm.

19. The fiber reinforcement lay-up apparatus according to claim 18, wherein the robot is a multiple axis robot having a fixed base and a rotatable hub coupled to the base such that it can rotate about a vertical axis, wherein the robotic arm extends from the rotatable hub, and wherein the dispenser is fixed to the rotatable hub.

* * * * *